United States Patent
Porter et al.

(10) Patent No.: US 7,134,220 B2
(45) Date of Patent: Nov. 14, 2006

(54) FLUID LEVEL MEASURING DEVICE HAVING AT LEAST ONE COMPRESSIBLE MEMBER

(75) Inventors: Curtis H. Porter, Huntsville, MO (US); John M. Dougherty, Clark, MO (US); Steve Marek, Moberly, MO (US); Michael Halferty, Columbia, MO (US); Jeff Tayon, Moberly, MO (US)

(73) Assignee: Orscheln Products LLC, Moberly, MO (US)

(*) Notice: Subject to any disclaimer, the term of this patent is extended or adjusted under 35 U.S.C. 154(b) by 0 days.

(21) Appl. No.: 10/741,210

(22) Filed: Dec. 19, 2003

(65) Prior Publication Data

US 2004/0143985 A1 Jul. 29, 2004

Related U.S. Application Data (60) Provisional application No. 60/435,642, filed on Dec. 20, 2002.

(51) Int. Cl.
*G01F 23/04* (2006.01)
(52) U.S. Cl. .................. 33/722; 33/728; 73/290 R
(58) Field of Classification Search ................. 33/722, 33/728; 73/290 R, 298–299
See application file for complete search history.

(56) References Cited

U.S. PATENT DOCUMENTS

| | | | | |
|---|---|---|---|---|
| 3,316,647 A | * | 5/1967 | Swallert ...................... | 33/722 |
| 3,371,418 A | * | 3/1968 | Moeller ....................... | 33/729 |
| 3,722,102 A | * | 3/1973 | Jackson et al. ............... | 33/731 |
| 4,174,574 A | | 11/1979 | Kirchweger et al. | |
| 4,186,604 A | | 2/1980 | Mattila | |
| 4,965,942 A | * | 10/1990 | Hoszowski ................... | 33/730 |
| 5,086,943 A | * | 2/1992 | Poskie ......................... | 33/722 |
| 5,241,753 A | * | 9/1993 | Lalevee, Sr. ................. | 33/726 |
| 5,485,681 A | * | 1/1996 | Hitchcock ..................... | 33/722 |
| 5,613,303 A | * | 3/1997 | Kayano et al. ............... | 33/731 |
| 5,829,153 A | * | 11/1998 | Hitchock ...................... | 33/728 |
| 6,314,808 B1 | * | 11/2001 | Williams et al. ............. | 33/722 |
| 6,453,740 B1 | * | 9/2002 | Williams et al. ............. | 33/722 |
| 2002/0023488 A1 | | 2/2002 | Williams et al. | |
| 2003/0150125 A1 | * | 8/2003 | Dougherty et al. ........... | 33/722 |

OTHER PUBLICATIONS

U.S. Appl. No. 10/172,632.
U.S. Appl. No. 10/261,854.
U.S. Appl. No. 10/741,210.
International Search Report OPD011MD-PCT.

* cited by examiner

*Primary Examiner*—Yaritza Guadalupe-McCall (57) ABSTRACT

A fluid level measuring device, also referred to as a dipstick, for measuring the fluid level in a fluid reservoir or tank, such as an oil pan or transmission reservoir in an internal combustion engine. The fluid level measuring device includes a stationary tube onto which lugs can be directly attached. The dipstick assembly includes a fluid level indicator measuring blade attached to an elongated shaft that is molded into a plastic handle assembly. The plastic handle assembly includes a bayonet type locking mechanism for locking the handle to the stationary tube assembly. A compressible seal forms a pressurized seal between the stationary tube assembly and the handle.

24 Claims, 9 Drawing Sheets

FLUID LEVEL MEASURING DEVICE HAVING AT LEAST ONE COMPRESSIBLE MEMBER

This Application claims benefit of Provisional U.S. Patent Application Ser. No. 60/435,642, filed on Dec. 20, 2002. The disclosure of the provisional patent application is hereby incorporated by reference.

FIELD OF THE INVENTION

The subject invention is directed to a device used to measure fluid levels, and more particularly, to dipsticks used to measure fluid levels by contacting an indicator at one end of the dipstick into a fluid holding compartment or reservoir.

BACKGROUND OF THE INVENTION

It is known to use a fluid measuring device for indicating the fluid level in a selected fluid holding compartments of internal combustion engines, transmissions, and other machinery requiring fluids for lubrication and cooling. Typically, the fluid measuring device is a dipstick for checking the level of fluid such as engine or transmission oil, or hydraulic fluid within one of the many fluid holding compartments in the engine, transmission, or other machine. The dipstick is normally an elongated indicator that is slidably located within a conduit or pipe attached to the engine, transmission, gear box, reservoir or machine in which a fluid level indication is desired. When the dipstick is fully inserted into the conduit, one end is immersed into the fluid. When an actual reading of the fluid level is desired, the other end of the dipstick is pulled from the conduit thereby removing the entire dipstick from the conduit to allow the user to read the fluid level from the one end. The dipstick is then reinserted into the fluid compartment once the fluid level has been checked.

Traditional fluid level indicator systems typically consist of a two piece system with a holding tube and a dipstick. Examples of conventional dipstick systems are disclosed in U.S. Pat. Nos. 3,371,418; 5,485,681 and 5,829,153; the disclosure of each of which is hereby incorporated by reference. The holding tubes are generally fabricated from metal tubing and require various forming operations including bending, flaring, and machining, followed by the attachment of a dipstick receptacle. In addition, the dipstick is fabricated from multiple components including a handle, washer, cap, rubber stopper, shaft assembly, and a marked spring steel shaft mechanically joined to a spring steel blade. The actual assembly of these various components involves multiple assembly operations requiring costly, time-consuming, and labor intensive manufacturing steps. Therefore, a simpler design requiring fewer parts and connections as well as less forming is desirable.

Engines, transmissions, and machinery designs have become relatively smaller, more compact, and of less weight than traditional engines, transmissions, and machinery. Therefore, fluid level indicator systems must be smaller, more compact, and lighter weight. Moreover, the fluid access routes or paths through which the fluid level indicator system accesses the fluid storage compartments are becoming more complex (more twists and turns as well as longer runs), smaller, and more compact.

There is a need in this art for a fluid level indicator that extends a defined distance into the fluid reservoir in order to provide an accurate reading (i.e., measurement of the amount of liquid within the reservoir). Variations in the length of a shaft associated with a fluid level indicator blade can cause overextension or under-extension of the blade into the reservoir thereby providing an inaccurate reading on the blade.

SUMMARY OF THE INVENTION

The instant invention solves problems associated with conventional fluid level measuring systems by providing a fluid level measuring device comprising a tube having lugs extending therefrom that engage slots defined in a handle, and the handle is associated with a shaft/indicator blade that extends beyond the tube a defined distance into a fluid reservoir (in order to obtain an accurate fluid level measurement). The indicator blade can either be connected to the shaft, or an extension of the shaft (e.g., a unitary blade wherein an end portion comprises the indicator blade). At least a portion of the shaft comprises a compressible member. By "compressible" it is meant that the shaft includes a spring, is compressible, can be deflected or deformed so as to reduce the distance between the handle and the indicator blade, among other means for effecting compression. The shaft can also include an enlarged region at least a portion of which engages or becomes seated against a protuberance or embossed section of the tube. By "enlarged region" it is meant that at least a portion of the region has a diameter that is larger than the tube protuberance such that the enlarged region cannot travel pass the protuberance. The protuberance can comprise a deformed or shaped section of the tube, an inserted member, among other configurations for engaging the enlarged region.

In a first aspect of the invention, the fluid level measuring device comprises a handle having at least one slot defined therein and an associated dipstick, a tube having lugs directly attached to the tube and dimensioned to engage the slotted handle, and a gasket or grommet associated with the handle. The lugs on the tube can be inwardly or outwardly extending. When the lugs engage the slots, the gasket or grommet can urge the handle and tube into a locked position.

In one aspect of the invention, the handle associated with a dipstick that be free to swivel or rotate freely within a plastic handle (i.e., the dipstick/shaft can rotate relative to the handle). By being able to rotate (e.g., while being inserted through a non-liner tube and into an engine component), the dipstick can accommodate travel along nonliner routes without binding or being permanently deformed.

The fluid level measuring device comprises a stationary tube assembly extending from the fluid compartment in which a dipstick is disposed. The dipstick typically includes a plastic handle that is joined (e.g., molded onto, pinned, glued, sonic welded, among other methods for attachment), to one end of a shaft (e.g., comprising a flexible spring steel wire shaft having an enlarged region for engaging a protuberance on the tube). A precision stamped fluid level indicator blade extends from a second end of the shaft and can be attached to the shaft by either die casting, spin welding, ultrasonic welding, or other bonding means, or by means of a fitting or other connector (alternatively, the indicator blade comprises an end portion of the shaft).

The tube assembly is normally made of a plastic or metallic material and optionally including a relatively large end or opening (e.g., formed by a coupler on the end of the tube). Lugs extend from the end and provide a bayonet interconnection between the tube and the handle assembly by twisting the handle assembly relative to the tube. The lugs can extend inwardly or outwardly depending upon the design of the handle, e.g., the handle can be inserted into an enlarged opening of the stationary tube or about the end of the stationary tube. This causes inter-engagement of the lugs with slots in the handle. Inserting the shaft (associated with the handle) into the tube also cause the aforementioned enlarged region associated with the shaft to engage a protuberance of the tube thereby compressing the shaft and allowing the indicator blade to extend a defined distance beyond the tube. An engine fitting extends from the tube and serves to guide the indicator blade to an appropriate location within the fluid cavity.

The instant invention also solves problems associated with conventional manufacturing methods by staking an engine fitting at the end of the stationary tube associated with the fluid level measuring device. The tube can be shaped or bent into a wide range of linear or non-linear configurations. Typically the tube comprises commercial grade steel.

A gasket or grommet can act as a pressure lock seal for sealing the handle to the enlarged end when the lugs are locked in the slots. This pressure lock seal serves to allow significant pressurization within the dipstick and oil pan or other chamber the dipstick is affixed to. The gasket can also urge the bayonet connection of the handle into a locked position.

The bayonet interconnection in unison with the gasket can supply an actual pressurized seal thereby allowing pressurized testing of the combustion engine, transmission, or other machinery without either removal of the dipstick or attempts at sealing the dipstick. Furthermore, a sealed dipstick allows the combustion engine, transmission, or other machinery to run at the intended pressure rather than either below the intended pressure or at the intended pressure due to an adjustment. The seal and locking engagement between the handle and enlarged end typically involves a quarter-turn sealing motion with an improved sealing capability and a positive lock feature. Alternatively, the bayonet interconnection seal releases pressure and allows the system to be vented (e.g., fluid level indicators for transmissions can be vented by using, for example, the gasket of FIGS. 4 and 5).

The structure is normally manufactured from lightweight, corrosion-resistant, plastic materials such as nylon, glass-reinforced nylon, steel and steel alloys (e.g., 1008, 1010, and silicon or aluminum killed draw quality alloys), among other oil, water and temperature resistant materials. A metallic shaft can be fabricated from stainless steel, zinc plated, phosphated, chromated, among other metal treatments to improved corrosion resistance.

In one aspect of the invention, the fluid level indicating system is capable of being in fluid communication with the combustion engine, transmission, or other machinery to which it is affixed while maintaining a constant pressurization therein through an improved method of sealing. Specifically, a seal that is capable of maintaining several atmospheres (at least 1 to 1.5 atm.) of back pressure is desirable in this aspect.

In another aspect, the invention provides a positive engaging, yet easy to use, locking arrangement for securely locking and sealing the dipstick within or over the tube with an easy manual motion. It is also desirable that this sealing of the dipstick within the tube is such that the tube may be pressurized to the same back pressure as the combustion engine, transmission, or other machinery. In other aspects of the invention, the locking arrangement employs a gasket or grommet that releases undesirable pressure.

In a further aspect, the invention provides a smaller and more compact fluid level indicating system which has improved flexibility for routing of the fluid level indicator system in and around the complex design of engines, transmissions, and machinery.

The instant invention can also be employed as a kit or an assemblage in order to retrofit existing dipstick systems. When employed as a retro-fit, the inventive dipstick system provides the same advantages as if installed as an original equipment dipstick.

Regardless of whether the aspects of the invention are employed alone or in combination, the instant invention provides a more corrosion-resistant, lighter weight, less complex, higher precision and more cost effective fluid level indicator system.

Still other advantages and benefits of the invention will become apparent to those skilled in the art upon a reading an understanding of the following detailed description.

BRIEF DESCRIPTION OF THE DRAWINGS

The invention may take physical form in certain parts and arrangements of parts, certain aspects and method of which will be described in detail in this specification and illustrated in the accompanying drawings that form a part hereof. Any dimensions shown on the Figures are for illustration purposes only, and the components shown in these Figures can be employed in a wide range of dimensions and configurations.

CROSS-REFERENCE TO RELATED PATENTS AND PATENT APPLICATIONS

The subject matter of the invention is related to U.S. patent application Ser. No. 08/976,781, filed on Nov. 24, 1997 and entitled "Fluid Level Measuring Device", now U.S. Pat. No. 6,314,808; Ser. No. 09/947,314, filed on Sep. 05, 2001 as a continuation of Ser. No. 08/976,781; Ser. No. 10/172,632, filed on Jun. 13, 2002 and entitled "Connection System For a Fluid Level Measuring Device"; Ser. No. 10/261,854 filed on Oct. 01, 2002 and entitled "Fluid Level Measuring Device"; and Ser. No. 10/340,700 filed on Jan. 09, 2003 and entitled "Fluid Level Measuring Device". The disclosure of each of these applications is hereby incorporated by reference.

DETAILED DESCRIPTION

The instant invention relates to a fluid level measuring device comprising a tube having lugs extending therefrom that engage slots defined in a handle. The lugs can be either inwardly or outwardly extending and are dimensioned to be received by the slotted handle. The handle is associated with a shaft having a dipstick for measuring fluid level. At least a portion of the shaft comprises a compressible member. The shaft further comprises an enlarged region for engaging a protuberance defined by the tube.

In a first aspect of the invention, the fluid level measuring device comprises a handle having at least one slot defined therein and a shaft having an associated dipstick, a tube having lugs directly attached to the tube and dimensioned to engage the slotted handle, and a compressible gasket or grommet associated with the handle. When the lugs engage the slots, the gasket or grommet can urge the handle and tube into a locked position.

One aspect of the instant invention relates to a fluid level indicator system comprising a handle, shaft/dipstick rotatably mounted within the handle, and a stationary tube having an opening for receiving the handle. The rotatably mounted shaft can be located within (e.g., over-molded by) the plastic handle in a manner that permits the shaft to rotate (or prevents the plastic from permanently bonding to the shaft). The handle can be received within or around the stationary tube opening. At least a portion of the shaft can be contacted with a fluid that prohibits an over-molding plastic handle from permanently bonding to the shaft. While any suitable material can be employed, examples of suitable materials comprise commercially available injection mold release agents, oils, lubricants, among others capable of preventing a permanent bond between the shaft and over-molded plastic. One material comprises a polymeric carrier such as an acrylic, urethane or epoxy and heat expandable spheres, e.g., butane filled thermoplastic shells such as Expancels® supplied by Akzo-Nobel. The shaft is, for example, dipped into the expandable material, and during the handle plastic over molding process the heated plastic causes the material to expand thereby preventing the thermoplastic from bonding to the shaft. Any bond forming between the expandable material and the shaft can be broken by rotating the shaft. If desired, the fluid can be supplemented or replaced by using a sleeve or material that is consumed during the over-molding process. Alternatively, a roller tube or sleeve can be placed around the shaft such that the over-molding plastic bonds to the pin while allowing shaft to rotate within the tube.

Another aspect of the invention relates to an improved manufacturing method and resultant product wherein the stationary tube is staked onto an engine fitting (the engine fitting guides the shaft and indicator blade into a fluid reservoir such as oil, transmission fluid, among others). Examples of suitable engine fittings and methods for attaching the same to the tube are described in the Cross-Reference to Related Patents and Patent Applications. This method can be employed for manufacturing fluid level indicators with rotary or stationary shafts. The stationary tube can have a linear or non-linear configuration, and a wide range of lengths. Employing a staking operation to affix an engine fitting onto the stationary tube ensures a fluid tight connection to the reservoir while reducing assembly costs.

A further aspect of the invention comprises a fluid level measuring device comprising a tube having lugs extending therefrom that engage slots defined in a handle, and the handle is associated with a shaft that extends beyond the tube a defined distance (into a fluid reservoir). At least a portion of the shaft comprises a compressible member. The compressible shaft can comprise wire strand, flat steel connected to a wire strand, flat steel connected to a spring, flat steel with a "Z" shaped portion that engages a tube protuberance, combinations thereof, among others. The shaft also includes an enlarged region at least a portion of which engages or becomes seated against a protuberance or embossed section of the tube. The enlarged region can have any suitable configuration. Examples of suitable configurations comprise a plug, bulb, circular, flat, frustoconical, oblong, obtuse, among others having symmetrical or unsymmetrical dimensions that engage the protuberance in a manner that applies a compressive force onto the shaft. In one specific aspect, a compressible shaft, e.g., comprising a wire shaft, is connected to an indicator blade such that the enlarged region of the shaft is adjacent to or overlies the connection. Term "adjacent" as used in this specification and the claims, unless expressly stated otherwise, means two components that are in contact with each other, are next to each other with a space separating them, or are next to each other with a third component in between. As the shaft is inserted into the tube the enlarged portion travels along the length of the tube until the enlarged portion engages the protuberance. The length of the shaft is such that it is necessary to compress the shaft in order to connect the handle to the tube, e.g., compress the shaft between the protuberance and open end of the tube. The location where the enlarged portion engages the protuberance defines the maximum distance that the enlarged portion can travel along the length of the tube thereby causing the attached indicator blade to extend beyond the tube a predetermined distance.

The protuberance can comprise a deformed or shaped section of the tube, an inserted member, among other configurations for engaging the enlarged region. While any suitable configuration can be employed, examples of such configurations comprise a crimped or deformed area upon the tube (e.g., an inwardly extending depression in the tube having a diameter less than the diameter of the enlarged area), a previously shaped member that is inserted into the tube that engages a groove, channel or ridge defined within the tube (e.g., cylindrical member having a snap fit connection into a groove defined in the tube), among other configurations sufficient to engage the enlarged region of the shaft.

Referring now to the drawings wherein the showings are for the purposes of illustrating certain aspects of the invention only and not for purposes of limiting the invention, the overall arrangement of such aspects of a fluid level measuring device A can best be understood by reference to FIGS. 1, 3, and 8–10. As illustrated therein, a fluid level measuring device A comprises a stationary tube assembly B with a dipstick assembly C removably and rotatably disposed therein. Specifically, tube assembly B is an elongated, hollow guide tube 10 with first and second spaced ends 12 and 14 having a through passage 16 that communicates with first and second openings 18 and 20 at the respective first and second ends.

The tube assembly B further includes an enlarged diameter coupler or spout 22 attached to the first end 12 of the guide tube 10. In one aspect, the coupler is joined to the first end 12 of the guide tube as described herein. The coupler 22 has a small diameter portion 24, a flare or tapered transition portion 26, and a large diameter portion 28 at its second end. The small diameter portion is closely received over the guide tube first end. The large diameter portion includes a pair of outwardly extending lugs 30A and 30B that form a portion of a locking assembly to be described in greater detail below. The coupler is also hollow, defining a continuous internal cavity that extends from a first or upper end 32 to a second or lower end 34. The internal cavity is enlarged at the upper end to accommodate an interconnection between the shaft and a handle, and, if desired, to provide an orifice for receiving a spout on a fluid container, such as an oil container. For example, the spout of a standard quart of oil will fit in this enlarged upper end. Alternatively, the enlarged upper end may be dimensioned to receive a different sized oil container. It will be appreciated, however, that the enlarged upper end will eliminate use of a funnel in many instances.

Dipstick assembly C includes a plastic molded handle assembly 50, an elongated relatively stiff, yet bendable compressible shaft 52 such as the stranded wire rope illustrated in the drawings (e.g., FIGS. 3, 8 and 11), and a fluid level indicator blade 54. The shaft 52 can optionally be rotatably mounted within plastic molded handle assembly 50, e.g., the shaft 52 can rotate and flex while being inserted along the typically non-liner length of the stationary tube. The handle 50 includes gripping portion 56 connected to a hollow cylindrical base 58 by a neck 60 of reduced dimension. The gripping portion preferably has a pair of knobs 62A and 62B extending outwardly and obliquely from the neck 60. The base 58, on the other hand, has a pair of slots 64A and 64B defined therein. In one specific aspect, each slot extends entirely through the base sidewall and is of a generally curvilinear conformation. The slots have an opening at one end along lower edge 66 of the base and a locking seat 68 at the other end of the curvilinear slot. Locking seat 68 is located at the closed end of the curvilinear slots and comprises an enlarged area, depression or other configuration that removably retains the lugs in the locking seat. Each of the curvilinear slots 64A and 64B is defined so as to have an axial portion aligned approximately with the shaft, and likewise the tube assembly B, and positioned adjacent the lower edge 66 of the base 58, and a generally transverse portion at the other end of the slots and in which locking seat 68 is defined.

The combination of slot 64A and 64B with lugs 30A and 30B defines a locking mechanism or bayonet type interconnection where lugs 30A and 30B slide in slots 64A and 64B. Axial insertion of the handle over the lugs and a quarter turn causes the handle base to slide over the coupler 22 whereby the lugs 30A and 30B become positively engaged in corresponding locking seats 68.

Shaft 52 is associated with handle assembly 50. Shaft 52 can be connected to handle assembly 50 by using any suitable method such as overmolding, gluing, pinning, among other methods and, if desired, shaft 52 can be associated with handle 50 in a manner that permits the shaft to rotate relative to the handle. Shaft 52 is provided within assembly 50 in a manner that achieves a secure interconnection. Fluid level indicator blade 54 is affixed to the other end of the shaft 52 by die casting (or alternatively, by a staked attachment fitting 70 or other suitable mechanical connection). The die cast construction eliminates tolerance stack-up problems associated with prior arrangements, reduces the number of components, and provides a smooth transition fitting that does not catch in the guide tube. The indicator blade 54 is typically rounded or pointed at its free end to allow for easy insertion into the coupler 22, through the guide tube 10, and through engine fitting 72. The indicator blade also includes indicia, such as shaded area 74A and arrows 74B and 74C on at least one of the faces of the blade, for indicating the fluid level when dipstick assembly C is inserted fully into stationary tube assembly B that extends from the engine fitting.

Engine fitting 72 is compression sealed or press fit within second opening 20 of the guide tube 10. Alternatively, the fit may be a tight seal, a threaded fitting, or other connector, or the fit may involve bonding, gluing, molding, or other means of sealably connecting. A lip 76 prevents engine fitting 72 from complete insertion into elongated guide tube 10. The opposite end of engine fitting 72 is attached or bonded to a fluid reservoir or tank, such as found in an internal combustion engine, where it is desirous to measure the fluid level within the reservoir. In one specific aspect, this engine fitting is made of steel and has a serrated outer surface 78 (although alternatively, the outer surface may be roughened, knurled, or of other texture).

With the engine fitting 72 connected to a fluid reservoir and providing access for dipstick assembly C, the opposite end of stationary tube assembly B, i.e., the coupler 22, is secured at a convenient location remote from engine fitting 72. The elongated through passageway that connects coupler 22 and engine fitting 72 thereby provides access to the fluid in the reservoir via dipstick assembly C. Specifically, fluid level indicator blade 54 is inserted through the coupler and guide tube 10 such that the free end of blade 54 is immersed into the fluid in the reservoir. It will be appreciated that since the shaft is bendable (and optionally rotatable relative the handle), the guide tube can adopt twists and turns along its route and the dipstick assembly can accommodate the tortuous path. For the blade 54 to be fully inserted, handle 56 must engage and interlock with coupler 22 and lugs 30A and 30B extending therefrom. Specifically, lugs 30A and 30B align with the open end of slot 64A and 64B respectively, whereby the handle is further forced over the coupler 22 resulting in lugs 30A and 30B following the curvilinear shape of slots 64A and 64B until locked in locking seats 68. The result in the rotation by approximately 90° of the handle about the coupler 22 as lugs 30A and 30B move from the axial portion of the respective slots into the transverse portion and eventually the locking seat 68.

A seal 80 (FIG. 3) is located in the base of cavity 82, and normally glued, bonded or otherwise affixedly seated within the cap. The seal can provide a pressure lock seal when the dipstick assembly is fully received in the guide tube. This seal has sufficient elasticity to allow compression of the seal by the coupler 22, or the end of the tube. This bayonet type locking arrangement provides assurance that fluid level indicator blade 54 is properly positioned for accurate fluid level readings as well as providing a positive lock feature for assuring that handle 56 is locked to stationary tube assembly B. Moreover, the seal can provide sufficient sealing capabilities to allow the engine, transmission, or other machinery to reach several atmospheres (preferably at least 1 to 1.5 atm.) of back pressure without leakage. In addition, when fully sealed, the seal prohibits contaminants from entering into the fluid reservoir where system integrity and reliability would be jeopardized, and prohibits unnecessary fluid loss from the assembly. When a compressible and resilient seal is employed, the seal functions to urge the handle and lugs into a locked position, e.g., locking the bayonet mechanism compresses the seal which in turn causes the seal to urge the handle into a locked position relative to the locking lugs.

In one aspect, the coupler 22 and guide tube 10 are fabricated from plastics while engine fitting 72 is manufactured of high heat tolerating metals or plastics. Handle 56 is typically a molded component to or in which flexible shaft 52 is directly molded, joined, pinned, or otherwise connected. The handle is dimensioned to overlie or encompass the coupler or spout in its locked position to prevent contaminants from entering the guide tube. In an alternative aspect of the invention, described below in connection with FIG. 10, the handle is inserted into the spout. Moreover, the use of plastics can reduce corrosive effects and provides an overall reduction in system weight. Yet another advantage of using plastic in forming a number of the components is that the system can be color-coded for ease of use by the customer. Blade 54 is fabricated from steel or other comparable metals or plastics and is attached to flexible and rotating shaft 52 by attachment fitting 70 as described above. Alternatively, an end portion of shaft 52 comprises an indicator. It will be appreciated, however, that other suitable materials may be used without departing from the scope and intent of the subject invention.

Figures 1, 2:
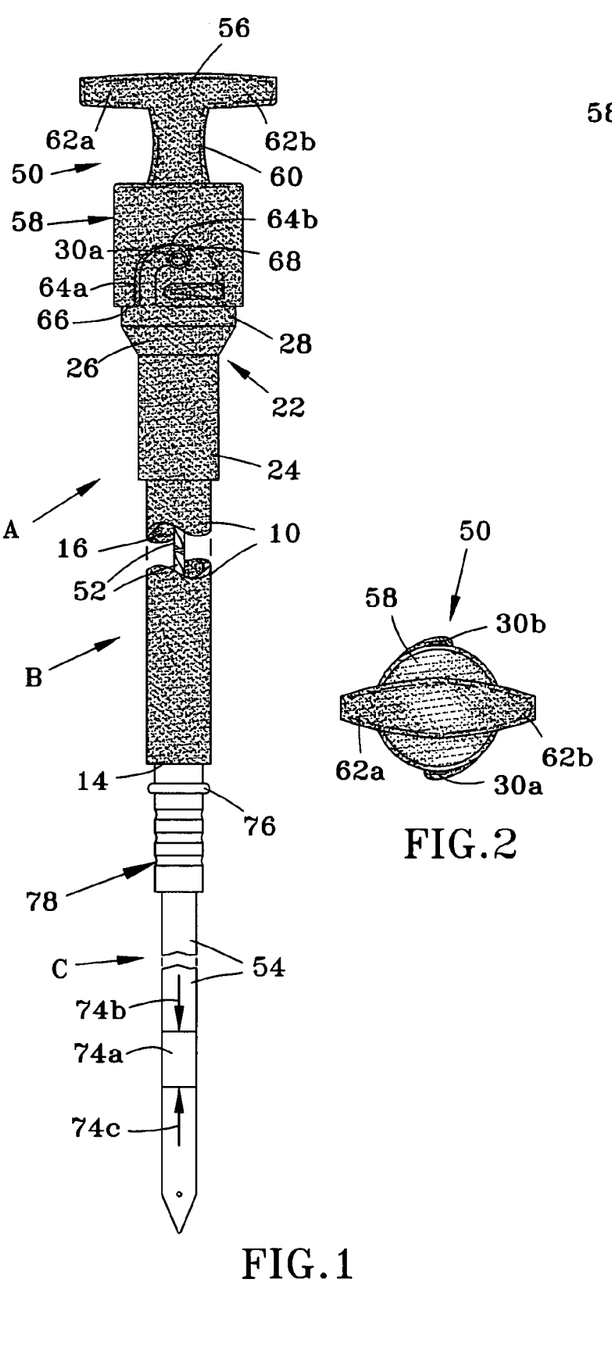
FIG. 1 is a side view of the fluid level measuring device including the stationary tube assembly with a dipstick inserted therein having a handle attached to one end thereof.
FIG. 2 is a top view of the fluid level measuring device.
Figure 3:
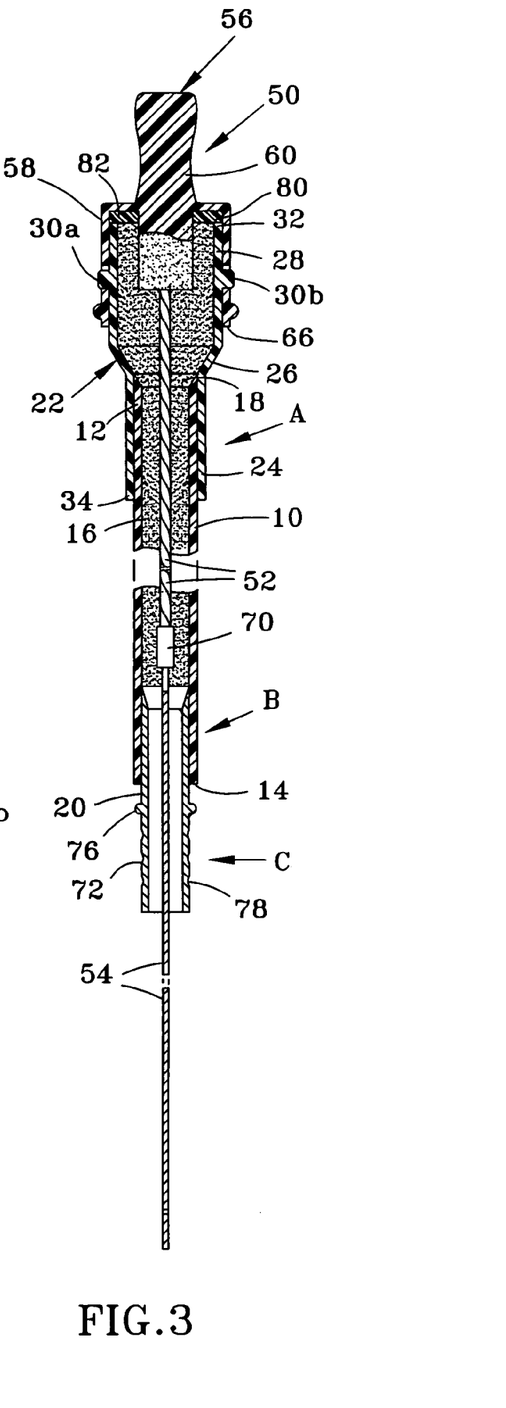
FIG. 3 is a partial sectional view of the fluid measuring device of FIG. 1.
Figure 4:
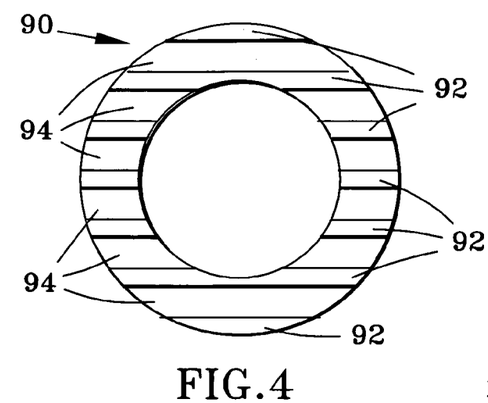
FIGS. 4 and 5 are front and side elevational views, respectively, of another sealing gasket.
Figures 5, 6:
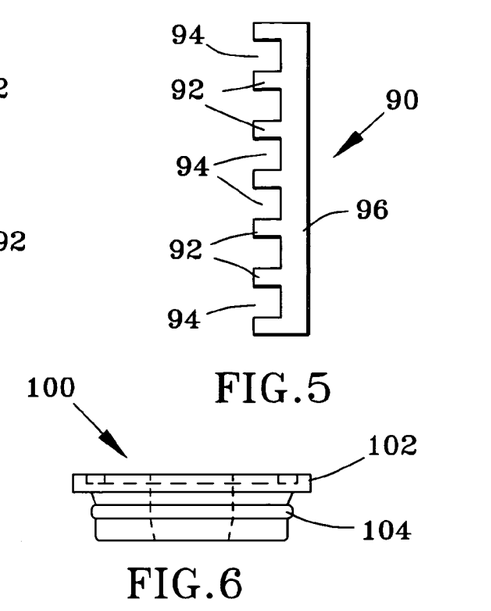
FIGS. 6 and 7 are elevational views of further grommet seals.

FIGS. 4–5 illustrate another aspect of the subject invention. In this arrangement, a different configuration grommet 90 is shown. It, too is of annular construction and can comprise a series of legs 92 disposed in generally parallel relation and extending across the entire width of the annular grommet. That is, the legs are separated by groves 94 so that the legs extend outwardly a minor dimension on the order of approximately 0.10 inch. An opposite face of the grommet 96 has a general planar conformation and fits within the base of the cavity defined by the handle. Thus, as will be appreciated, the grommet may be adhesively secured or be appreciated, the grommet may be adhesively secured or interference fit into the base of the handle and is adapted to engage against end 32 of the spout or tube. The alternating legs and grooves on the face of the grommet that engages the end of the spout prevents a pressure seal from being formed in this particular version, however, by forming the grommet from an elastomeric material such as neoprene, the positive locking capability described in association with the aspects of the invention illustrated in FIGS. 1–3, 10 and 12 is maintained. That is, the user encounters a positive lock feel as the lugs enter the locking seats in the end of the slots. The elastomeric nature of the grommet serves as an integral portion of the locking function as the lugs 30 extend through the grooves 64, 66 in the handle. Engagement is made between the handle and the end of the spout. The lugs then pass the over-center position in the groove and urge the handle outwardly while maintaining the compressed relationship and ensuring a locked condition between the handle and the guide tube.

Figure 7:
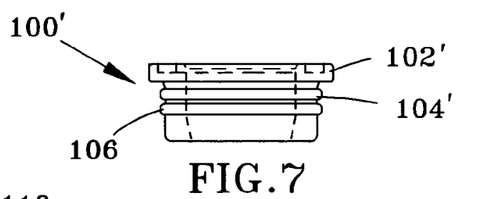
Figure 8:
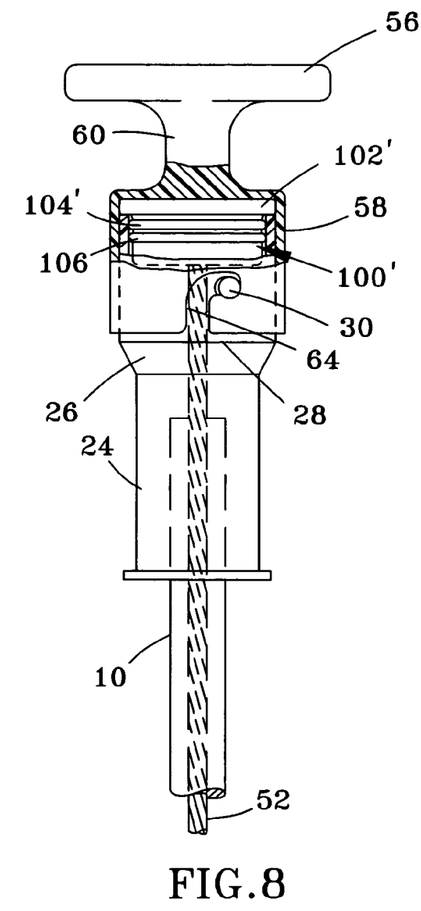
FIG. 8 is an elevational view, in partial cross-section, of the end of the dipstick assembly using the seal of FIG. 7 received on the tube assembly.

FIGS. 6–8 illustrate yet another version of a seal 100 that provides all of the same features and benefits of those shown and described in the earlier embodiments. FIGS. 6 and 7 illustrate two similar grommet seals 100 so that like components will be referred to by like reference numerals with a primed suffix (') in FIG. 7. The grommet has an enlarged shoulder 102 at one end that is received in the base of the handle. The shoulder has an outer diameter sufficient to engage against the axial end of the spout and perform the combined sealing and locking function as described above. In addition, a seal is formed in a radial direction with the wall of the spout by providing a circumferentially continuous sealing bead 104 (FIG. 6) or pair of beads 104; 106 (FIG. 7). In these arrangements, the sealing bead(s) is (are) integrally formed as a part of the grommet seal to reduce the number of components, eliminate additional assembly, and provide for an assembly that meets close tolerance specifications. Thus, as best illustrated in FIG. 8, once the handle is in the locked and sealed position, terminal end of the spout is sealed against shoulder 102. In addition, the seal beads 104, 106 engage the radial inner wall of the spout to provide an enhanced seal. In these aspects or arrangements, the seals form an interference fit with the handle. Thus, the enlarged shoulder 102 is dimensioned to form an interference fit in the base of the handle in addition to being sized for engagement with the terminal end of the spout.

Figure 9:
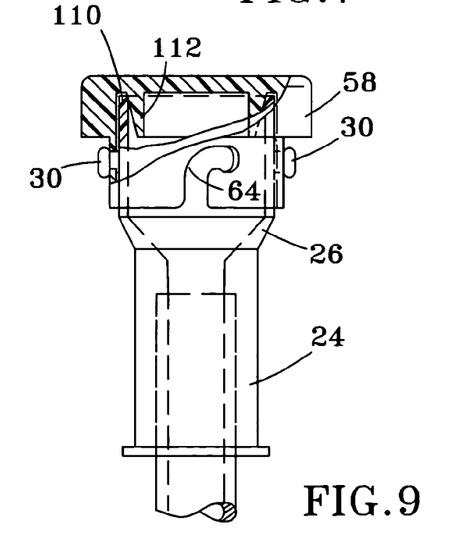
FIG. 9 is an elevational view of the end of the dipstick assembly incorporating yet another grommet embodiment for sealing the end of the tube assembly.

FIG. 9 shows yet another aspect of the invention that provides both an effective seal and positive locking feature. This aspect of the invention can be used as an opening to the fluid level reservoir (e.g., as an oil fill tube). Here, the grommet or seal 110 is integrally molded into the handle. The seal has an annular configuration that extends from the planar interior base of the handle. The grommet or seal in this and other aspects of the invention can be received within a channel or groove defined in the base of the handle. The seal is circumferentially continuous and has a tapered or flared radial outer face 112 that is dimensioned for sealing engagement with the spout. The tapered conformation serves the dual purpose of sealing the handle and spout, as well as providing the positive locking function described above. When the handle is in the fully locked position, the terminal end of the spout engages the integrally molded seal in the base of the cap in an axial direction and the tapered wall 112 sealingly engages the radial inner wall of the spout.

Figure 10:
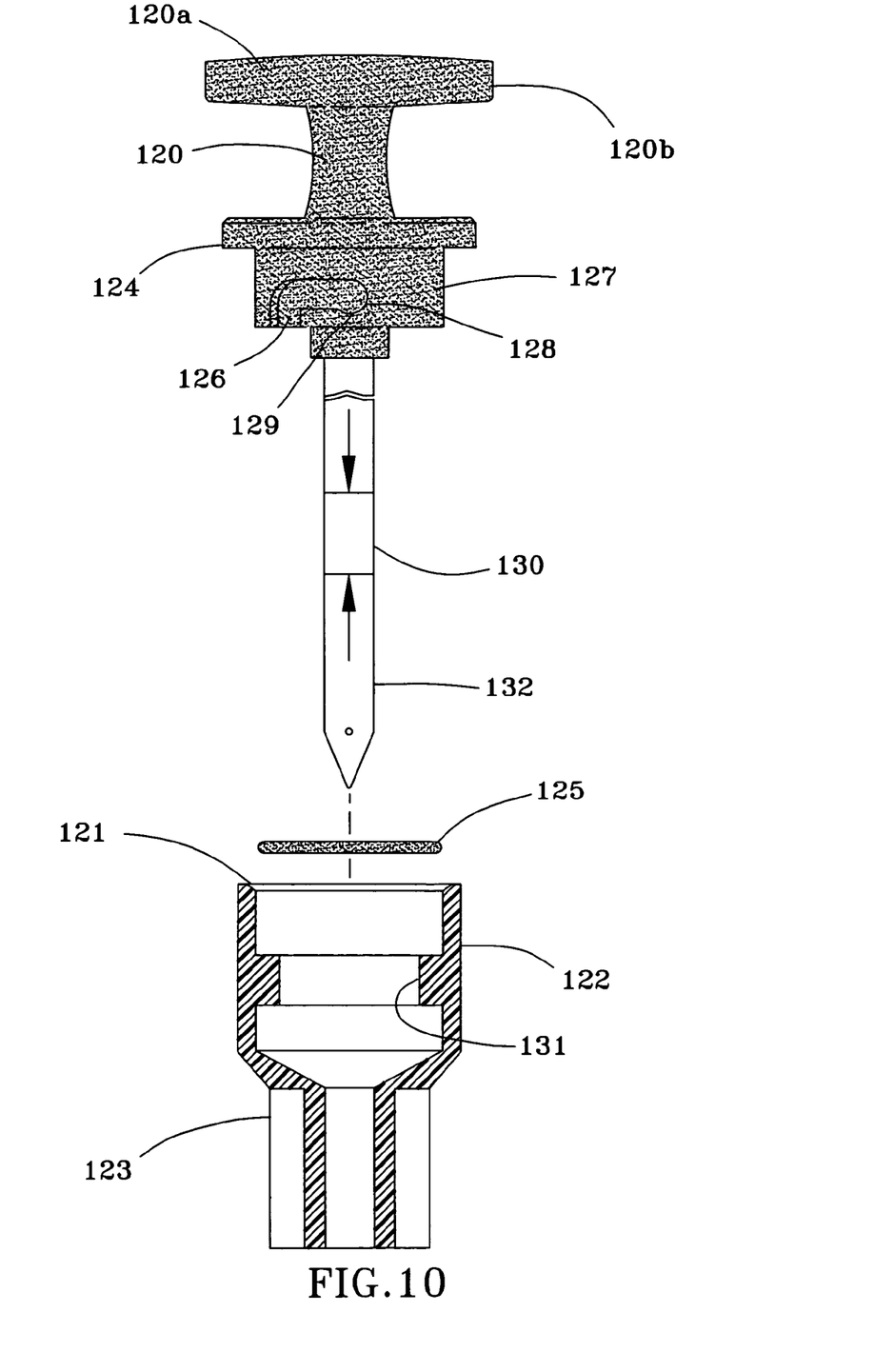
FIG. 10 is an exploded side view of the fluid level measuring device including the stationary tube assembly with a dipstick wherein the dipstick handle is inserted within an expanded end of the stationary tube.

Referring now to FIG. 10, FIG. 10 illustrates a further aspect of the invention wherein handle 120 is inserted and lockable within opening 121 defined in expanded spout 122 on one end of tube 123. Handle 120, as illustrated, includes gripping knobs or areas 120A and 120B (handle 120 can alternatively include the gripping knobs illustrated in FIG. 8). Handle 120 has the previously described bayonet connection, except that handle 120 is inserted within spout 122 and engages locking lugs 131 protruding inwardly from the inner surface of spout 122. As the handle 120 is inserted into spout 122, a recessed area (not shown) and defined within shoulder 124 engages gasket 125. Gasket 125 is compressed against shoulder 124 and the interior base of spout 122 as handle 120 is inserted into spout 122. As handle 120 is inserted into spout 122 curvilinear channels 126 (having one open end) defined in side-wall 127 engage inwardly protruding locking lugs on spout 122. Locking lugs travel along channels 126 until reaching area 128 at the closed end of channels 126. A recess 129 defined at area 128 functions to secure the locking lugs in a locked position within channels 126.

Dipstick shaft 130 (which can optionally be rotatable relative to the handle) is carried along with handle 120 as handle 120 is inserted into spout 122. As described above, the distal end of dipstick shaft 130 has a blade 132 that is employed for measuring a fluid level. Dipstick shaft 130 is free to flex as it is inserted into spout 122 and travels along tube 123.

Figure 11:
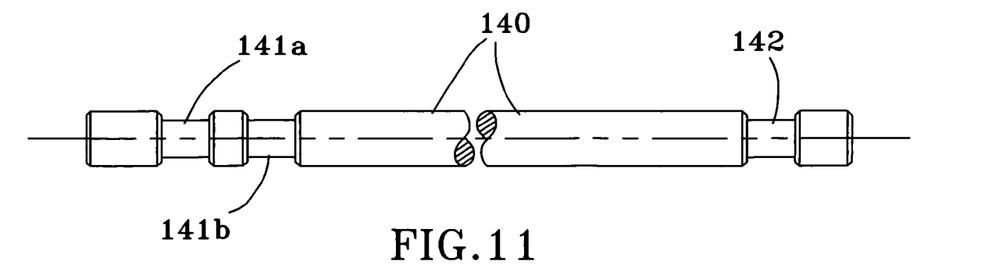
FIG. 11 is a side view of a shaft that is rotatably mounted within a handle.

Referring now to FIG. 11, FIG. 11 illustrates a rotatable shaft 140 that can be over-molded by a dipstick handle such as illustrated in FIGS. 1–3 and 8–10. When employing the optional rotating shaft, the rotatable shaft 140 is normally cleaned and polished to have smooth surface thereby enhancing the ability of shaft 140 to rotate within a dipstick handle. Shaft 140 has at least two chamfered regions 141A and 141B. These regions enhance the molding about shaft 140 as well as prevent shaft 140 from being pulled out of a handle. These regions can have any desirable configuration such as a flatten or nail head structure, semi-circular, among other configurations that permit rotation and prevent pull-out.

Shaft 140 also includes chamfered region 142. A blade (not shown) having a fluid level indicator at its distal end is connected to shaft 140 at chamfered region 142. The attachment can be achieved by any suitable method such as die-casting, staking, riveting, welding, among other conventional methods for attaching elongated metal articles.

If desired the shaft 140, in either rotatable or stationary configurations relative to the handle, can be used for improving the ease with which the shaft is inserted into the tube. When the shaft comprises a relatively flexible member, e.g., wire strand, the flexible shaft can bend or deform during insertion into the tube thereby making insertion somewhat difficult (and can require both hands). This difficulty can be minimized by employing a relatively rigid shaft 140 that is connected to a flexible shaft (e.g., wire strand), and the flexible shaft is connected to a fluid level indicator blade. The shaft 140, flexible shaft and fluid level indicator blade can be connected to each other by any suitable method such as crimping, sweging, die-casting, among other conventional methods. The presence of the shaft 140 enables a force to applied to the handle that is sufficient to cause the remainder of the shaft to travel through the tube, e.g., there is no significant deformation of the portion of the shaft adjacent to the handle.

Figure 12:
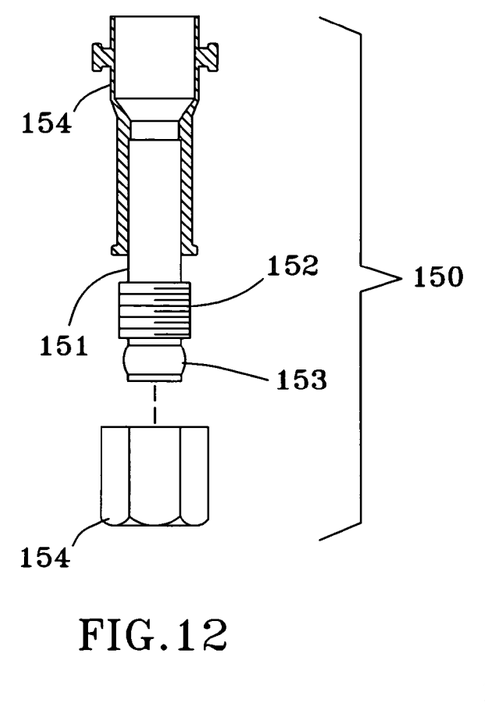
FIG. 12 is an exploded side view of a fluid level measuring device that can be retrofit to replace an existing fluid level measuring assembly.

Referring now to FIG. 12, FIG. 12 illustrates a retro-fit kit that can be employed for replacing conventional dipsticks with one of the inventive fluid level indicators disclosed herein. Kit 150 comprises compression sleeve 151 having threaded area 152 and compressive fitting 153. Kit 150 further comprises compression nut 154 and stationary tube member 154. Stationary tube member 154 typically comprises one of the stationary tubes illustrated in FIGS. 1, 3, and 8–10. The portion of compressive sleeve 151 in contact with stationary tube member 154 typically has a diamond knurled surface finish. In order to install kit 150 as a retrofit for an existing dipstick system, the existing dipstick system, which comprises the dipstick and the portion of the stationary tube contacting the existing dipstick, is removed, e.g., sawing, clipping, among other methods for cutting metal. Compressive nut 154 is slid over the existing stationary tube (after removing the original dipstick system). The stationary tube 154 including sleeve 151 are located in the stationary tube. Compressive nut 154 is contacted with threaded area 152 and tightened sufficiently to retain stationary tube 154 and sleeve 151 at a fixed position. Thereafter, the inventive dipstick system can be employed and locked into position by using the inventive bayonet connection.

Figure 13:
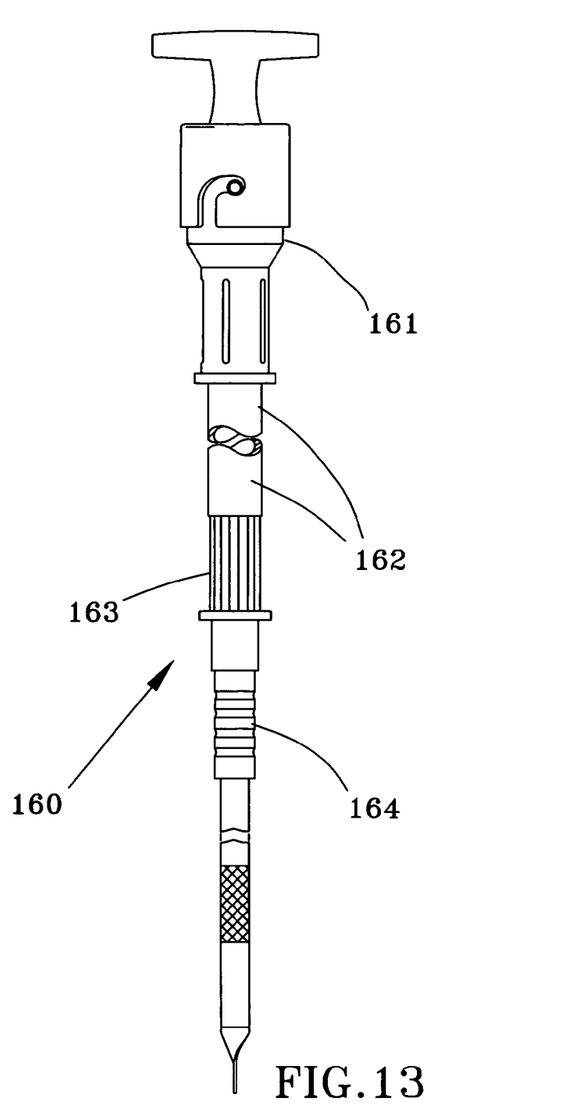
FIG. 13 is a side view of the fluid level measuring device including the stationary tube assembly with a dipstick inserted therein having a handle attached to one end thereof and a staked engine fitting at the other end.

Referring now to FIG. 13, shows fluid level indicator assembly 160 comprising a cap locking assembly 161 shown in FIGS. 1–3, 8–9 and 10 or in aforementioned U.S. patent application Ser. No. 09/947,314. Cap locking assembly 161 is attached to stationary tube 162. Stationary tube 162 is staked at 163 onto engine fitting 164. Tube 162 and engine fitting 164 are illustrated in greater detail in FIGS. 14–16.

Figure 14:
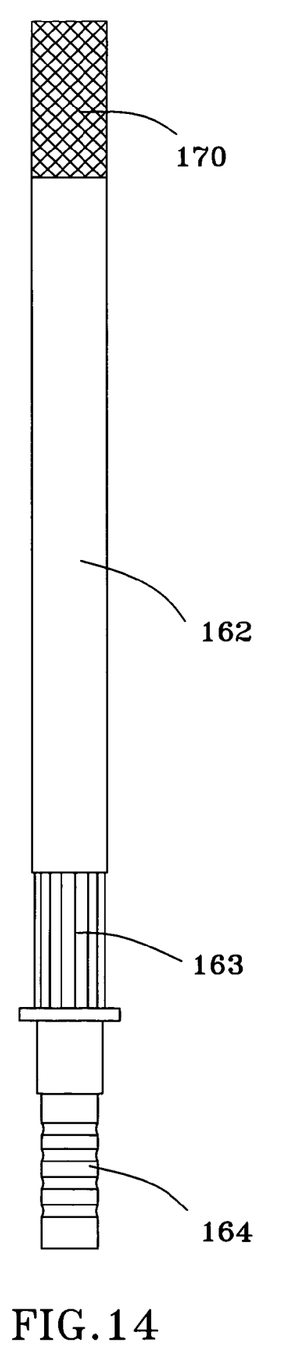
FIG. 14 is a side view of the stationary tube assembly of FIG. 13 and an associated staked engine fitting.

FIG. 14 illustrates stationary tube 162 staked onto engine fitting 164. The end of stationary tube 162 opposite from the engine fitting 164 contains a knurled region 170. Region 170 is provided for enhancing the bond between tube 162 and an overmolded thermoplastic material (e.g., nylon 6,6) used in forming locking cap assembly 161. Staking region 163 can be formed by using any suitable machine such those supplied by EZ Crimp (e.g., containing 8 jaws and reducing the diameter of the stationary tube from 0.50 to about 0.475). The degree of diameter reduction and length of staking region can vary widely.

In one aspect of the invention, the cap assembly can be connected to the stationary tube without the aforementioned over-molding process. The cap assembly can be attached via a threaded connection, contacting the interior of the stationary tube and expanding the stationary tube into contact the coupler or cap assembly, compression/snap fit connection, gluing, among other methods for affixing the cap assembly.

Figure 15:
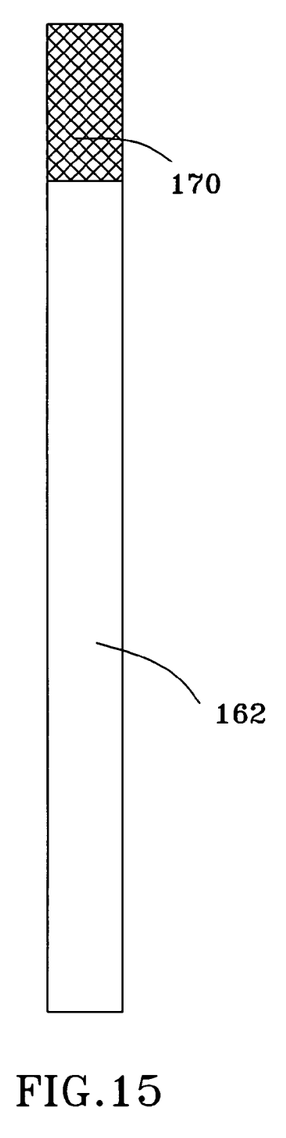
FIG. 15 is a side view and cross-sectional drawing of the stationary tube illustrated in FIGS. 13 and 14.
Figure 16A:
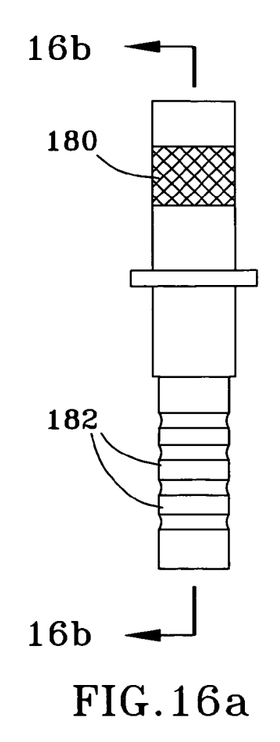
FIG. 16 is a side view and cross-sectional drawing of the engine fitting illustrated in FIGS. 13 and 14.
Figure 16B:
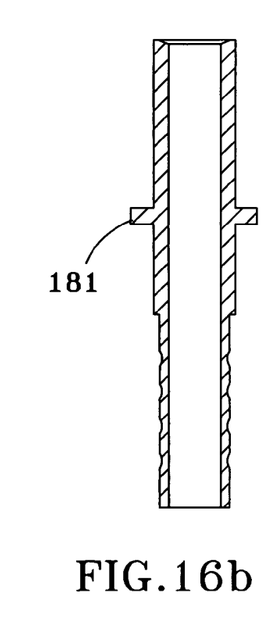

FIGS. 15 and 16 illustrate greater detail of tube 162 and engine fitting 164. Tube 162 can be fabricated from any suitable material such as ASTM J525, ASTM A513 Type 1 or 2 Alloy, among other materials capable of withstanding staking. Engine fitting 164 can also be fabricated from any suitable material such as 12L or 15 ASTM Alloy A108, lead free alloys, among other suitable materials. Tube 162 can be fabricated in accordance with any suitable method. One suitable method comprises shaping or bonding the tube into a desired configuration by employing commercially available machines such as compression bending, rotary draw bending, among other apparatus. The tube can include a protuberance for engaging an enlarged portion of the shaft. Engine fitting 164 can be shaped by any suitable method such as by a conventional screw machine operations. Engine fitting 164 can include an optional knurled region 180 for enhancing bond formed by staking at region 163. Protuberance 181 about the exterior of engine fitting 164 is dimensioned to receive tube 162. Engine fitting 164 is maintained at a predetermined location with respect to the engine's fluid reservoir by grooves 182 defined upon the surface of the engine fitting.

Referring now to FIGS. 17A through 20B, these Figures illustrate one aspect of the invention wherein the lugs extending from the tube are directly attached to the tube (e.g., without using a coupler). Such a construction method reduces assembly costs without affecting the effectiveness of the fluid level indicator. The tube can be straight or a virtually unlimited array of non-linear configurations that are tailored for a particular vehicle. The shaft can comprise a rotating member or have a position that is permanently affixed relative to the handle.

Referring now to FIGS. 17A through 17C, FIG. 17 shows a fluid level indicator assembly 190 comprising tube 191 for receiving handle 192. Assembly 190 can be linear or non-linear depending upon the dimensions of the vehicle onto which the assembly is attached. Handle 192 is connected to shaft 193 that includes a fluid level measuring device (e.g., a blade with height markings). Handle 192 defines slots (refer to FIGS. 18A and B) for receiving outwardly extending lugs 194 (refer to FIGS. 19A through 20B) that are attached directly to tube 191. Tube 191 can define at least one protuberance or projection for engaging an enlarged portion of the shaft.

Figures 17A, 17B, 17C:
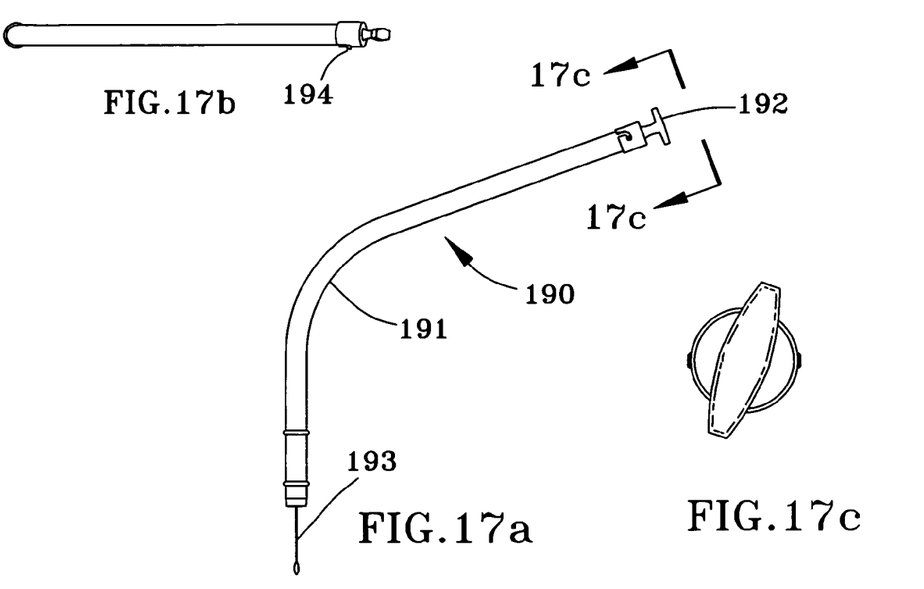
FIGS. 17A through C illustrate another aspect of the invention in an assembled view wherein lugs are attached directly to the tube.
Figure 18A:
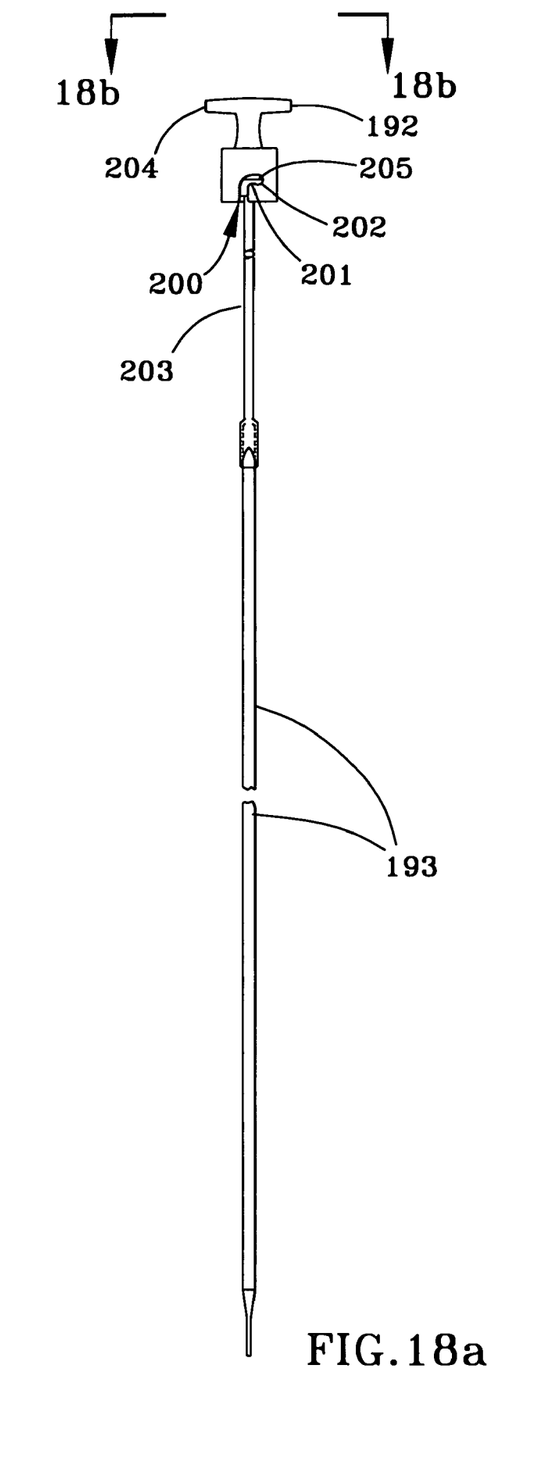
FIGS. 18A and B illustrate the handle of the assembly shown in FIGS. 17A through C.
Figure 18B:
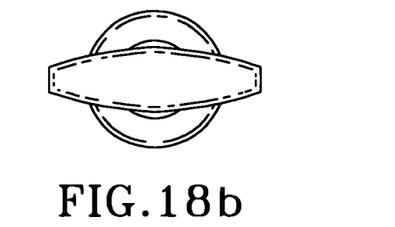
Figures 19A, 19C:
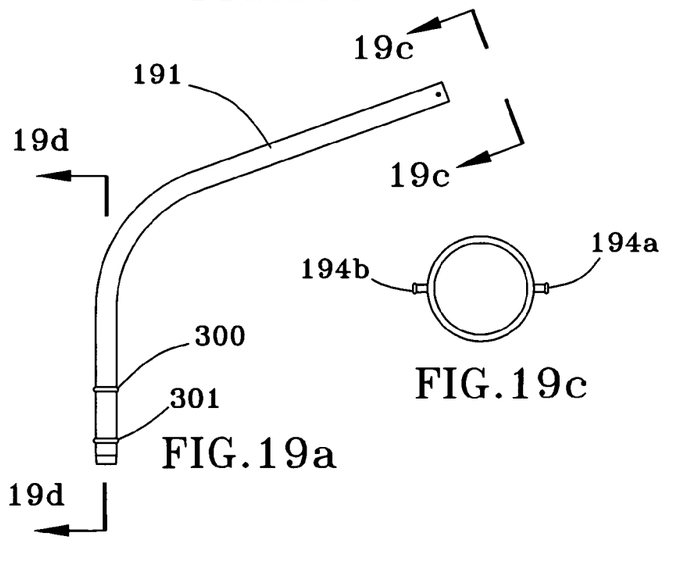
FIGS. 19A through E illustrate the tube of the assembly shown in FIGS. 17A through C.
Figure 19B:
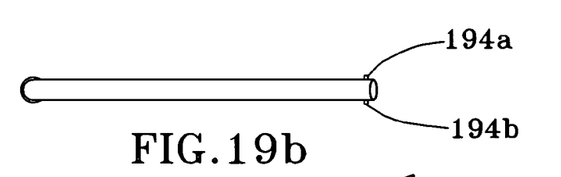
Figure 19D:
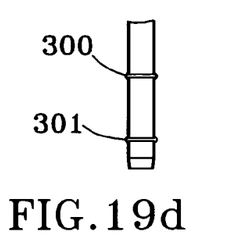
Figure 19E:
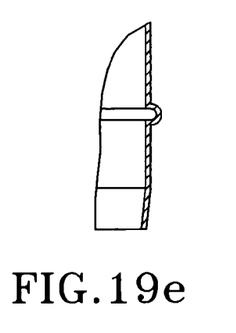

FIGS. 18A and B illustrate handle 192 illustrated in FIGS. 17A through 17C. Handle 192 defines two slots 200 for receiving lugs 194 of tube 191. Slots 200 are non-linear include projection 201 and terminate at in a locking-seat or depression 202. Slots 200 can be configured and dimensioned to engage internal or external extending lugs (refer to FIGS. 1–3, 9, 10 and 13). Shaft 203 is attached to handle 192 by any expedient method. Examples of such methods comprise molding, pinning or riveting, gluing, among other conventional attachment methods. Shaft 203 can comprise a blade or solid member similar to device 193, wire, strand, among other articles that can be affixed to handle 192. Fluid level measuring device 193 is connected or attached to shaft 203 by any expedient method such as die casting, riveting, welding, among other conventional attachment methods. Alternatively, the indicator blade can comprise an end portion of the shaft 203. Handle 192 defines gripping regions 204 that enhance the ability of a vehicle operator to twist the handle for removal from the tube. Gripping regions 204 can comprise any suitable configuration such as the T illustrated in FIGS. 17A through 18B, knurled, among other protuberances that enhance gripping. A gasket or grommet 205 is received within the base of handle 192. The gasket 205 can be received within the base of handle 192 and have any suitable configuration such as illustrated previously in FIGS. 1–7 and 10. The gasket 205 contacts the tube 191 in at least one area such as tube end face, an inner wall of the tube and exterior wall of the tube.

FIGS. 19A through 19E illustrate tube 191 of assembly 190 illustrated in FIGS. 17A through 17C. Tube 191 includes lugs 194A and B that are connected directly to tube 191. These lugs can be affixed or connected to the tube by any expedient method such as projection welding, self-clinching, drilling and filling with a fastener, among other conventional methods for connecting a lug. As described above, lugs can be either inwardly or outwardly extending. Alternatively, the lugs can be replaced with a suitable protuberance wherein the protuberance engages the slotted handle in a manner similar to a lug and locks the handle to the tube. In the case of an inwardly extending protuberance, the protuberance can be formed by creating an indent (e.g., by forcing a punch or other tool partially through the wall of the tube).

The configuration of tube 191 can vary widely depending upon the vehicle in which the tube is attached. If desired, the first end of the tube (i.e., the end adjacent lugs 194) can be flared to have a diameter that is greater than the remainder of the tube, or a coupler having a relatively large diameter can be compression fit into the first end. The second end of tube 191 can also include flared areas such as 300 and 301. Shaft portion 193 can include an enlarged portion for engaging a protuberance in tube 191. These areas can be employed for retaining the tube at a predetermined location while shaping the tube, retaining a compression fit engine fitting, among other uses. The tube 191 and handle 192 can have a sealed interconnection or vented depending upon the fluid level being measured (e.g., a transmission fluid reservoir that is vented, for example, by using the gasket of FIGS. 4 and 5).

Figure 20A:
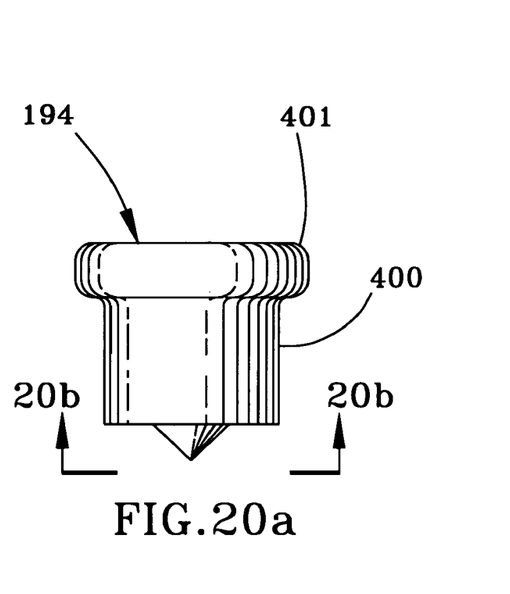
FIGS. 20A and B illustrate the lugs shown in FIGS. 17A through C.
Figure 20B:
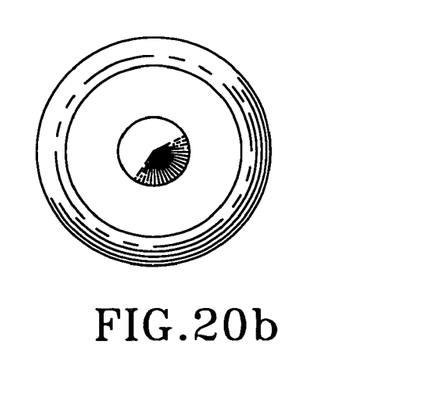

Referring now to FIGS. 20A and 20B, these Figures illustrate lug 194 that can be affixed to tube 191 of the assembly illustrated in FIGS. 17A through 19. Lug 194 defines a shank portion 400 and a head portion 401. While FIGS. 20A and 20B illustrate one lug, lugs can have any suitable configuration and cross-section (e.g., circular, oval, hexagonal, among others). The dimension and size of the lugs are selected so as to engage the slots defined in the handle.

Figures 21A, 21B, 21C:
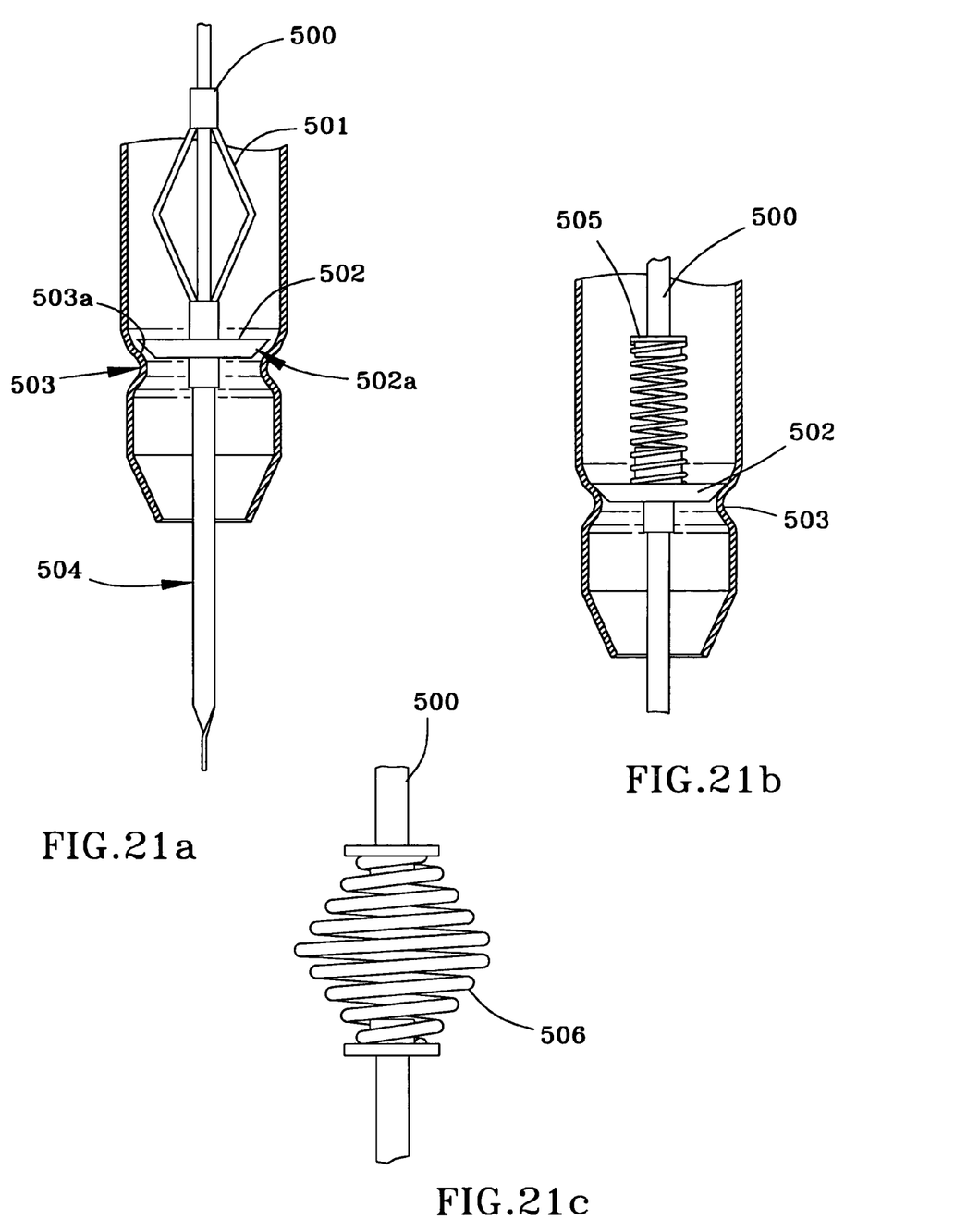
FIGS. 21A through C illustrate one aspect of the inventive compressible member.

Referring now to FIGS. 21A through C, FIG. 21A illustrates one aspect of a compressible shaft 500 that is connected to collapsible resilient/spring structure 501. Shaft 500 also includes a seat or enlarged region 502. Region 502 can comprise any suitable configuration or cross-section so long as region 502 is dimensioned to engage protuberance 503. The outer diameter or cross section of region 502 is greater than the minimum diameter of protuberance 503 (thereby preventing region 502 from passing beyond protuberance 503). Region 502 can be fabricated from any suitable material such as zinc-die casting, injection molded plastic, among other materials and methods. Region 502 can comprise plug or bulb configuration having a shoulder or inclined surface 502A that engages reclined surface 503A of protuberance 503.

Structure 501 collapses when a sufficient compressive force is exerted upon shaft 500 after seat 502A has engaged protuberance 503A. The indicator blade 504 that is connected to shaft 500 extends a predetermined distance outside of the tube (described above). This distance is defined by the location of protuberance 503 and seat 502.

Referring now to FIG. 21B, FIG. 21B illustrates an aspect of FIG. 21 wherein the compressible structure 501 is replaced with spring 505. The operation of the fluid level indicator of FIG. 21B is otherwise the same as FIG. 21A.

Referring now to FIG. 21C, FIG. 21C illustrates an aspect of FIG. 21 wherein the compressible structure 501 and seat 502 are replaced with a spring 506. The dimensions of spring 506 are selected so that the spring engages protuberance 503 in the manner described above.

Figure 22:
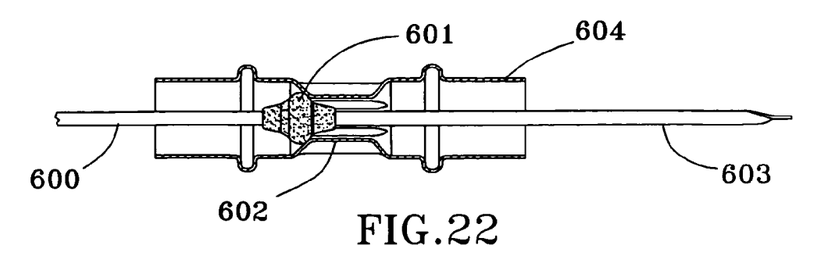
FIG. 22 illustrates another aspect of the inventive compressible member.

Referring now to FIG. 22, FIG. 22 illustrates another aspect of the invention comprising a compressible shaft 600 that is connected to enlarged region 601. As described above, enlarged region 601 can have any suitable configuration, location or material composition. The enlarged region 601 illustrated in FIG. 22 comprises a bulb or plug that is dimensioned to engage and mate with the interior surface of protuberance 602. Enlarged region 601 can overlie a connection (e.g., shaft 600 to an indicator blade 603). Enlarged region 601 contacts protuberance 602 that can be formed by crimping or deforming tube 604. Protuberance 602, as shown, is uniform about tube 604 but can have any desirable configuration. When shaft 600 is inserted into tube 604, the distance that the shaft can travel through the tube is limited by protuberance 602. This in turn causes the indicator blade 603 to extend a predetermined distance beyond tube 604. As a result, indicator blade 603 provides a more accurate reading of the reservoir fluid level (not shown) into which it was inserted.

Figure 23A:
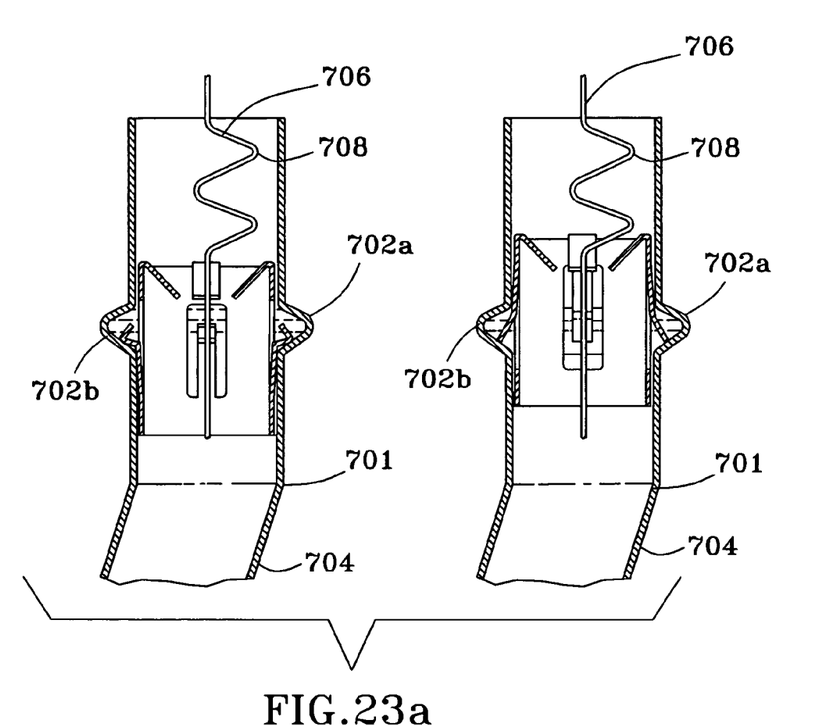
FIGS. 23A through C illustrate a protuberance for engaging the enlarged region of a shaft having the inventive compressible member.
Figure 23B:
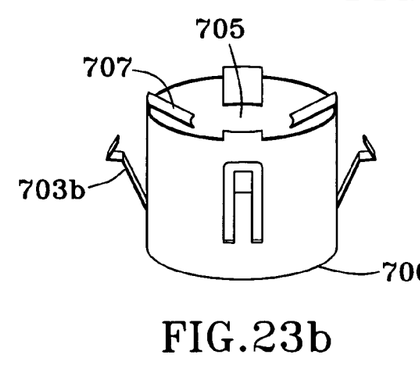
Figure 23C:
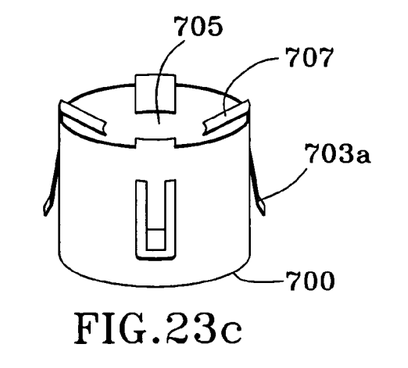

Referring now to FIG. 23, FIG. 23 illustrates one aspect of the invention wherein the protuberance comprises a member 700 that is inserted into or onto tube 701. The protuberance 700 engages a groove 702A in one aspect and 702B in another aspect that is defined by the tube. The protuberance 700 is maintained in place by employing a snap-fit locking mechanism 703A and 703B. At least two and typically 4 snap-fit or compression locking mechanisms are employed are employed on the protuberance 700. A protuberance 700 shown in FIGS. 23A and 23B can be inserted into the tube in order to engage a protuberance having the configuration shown by 702A or 702B. Alternatively, the protuberance 700 shown in FIGS. 23A and 23B can be inserted over the end of tube 701 adjacent to opening 704.

Once installed, protuberance 700 defines an opening 705 through which shaft 706 can extend. The protuberance 700 also define a surface (e.g, an inclined or a mating surface) 707 that contacts the shaft 706. The shaft 706 can contact the surface 707 via the enlarged regions described above. Alternatively, at least a portion of shaft 706 can comprise a spring or "Z" 708 that engages the surface 707 in a manner sufficient to compress 708 thereby defining the limit which shaft 706 can extend beyond opening 704.

With respect to FIGS. 21A through 23C, the location of the protuberance and enlarged area of the shaft can be at any suitable locations. Normally the protuberance will be located toward or adjacent the end of the tube that engages the fluid reservoir.

In a further aspect of the invention, an assembly is placed over the end of the tube (distal from the end associated with the handle and extending into the reservoir) in order to prevent articles, materials, broken dipsticks, among other foreign objects from entering the reservoir via the tube (e.g., minimize vandalism caused by inserting sand, rocks, debris, etc. into the oil fill, transmission fill or fluid level indicator tubes). The assembly is permeable to the fluid within the reservoir. While the assembly can have any suitable configuration, examples of suitable configurations comprise a woven wire, cage, mesh, perforated members, among other configurations that permit the fluid within the reservoir to contact the indicator blade while preventing relatively large objects from having uncontrolled contact with the reservoir. The assembly can be connected to the tube by using the snap fit or compression connections described in connection with FIGS. 21 and 23.

The invention has been described with reference to certain aspects. These aspects and features illustrated in the drawings can be employed alone or in combination. Modifications and alterations will occur to others upon a reading and understanding of this specification. Although the described aspects discuss plastic as one material of construction, it is understood that other materials can be used for selected components if so desired. It is understood that mere reversal of components that achieve substantially the same function and result are contemplated, e.g., the seal and locking features can be achieved by differently configured seals and/or lug and slot arrangements without departing from the present invention. It is intended to include all such modifications and alterations insofar as they come within the scope of the appended claims or the equivalents thereof.

The following is claimed:

1. A fluid measuring apparatus for an engine or a transmission reservoir comprising:
    a shaft comprising first and second ends wherein the first end of the shaft comprises a fluid level indicator wherein said shaft defines an enlarged area,
    a tube comprising a first end comprising a coupler with an open end and wherein said coupler has at least one lug, and a second end that is associated with the reservoir wherein at least one protuberance defined in said tube is dimensioned to engage the enlarged area of said shaft and wherein the shaft is deflected when the enlarged area engages the protuberance,
    a handle connected to the second end of the shaft and comprising at least one slot that comprises an axial portion and a transverse portion, wherein the axial portion of said at least one slot is open and engages said at least one lug and a terminal end of said at least one slot comprises a locking seat that engages said lug when in a locked position, and;
    a seal positioned in the base of the handle such that the seal is compressed against an axial end of the coupler when in the locked position.

2. The apparatus of claim 1 wherein at least a portion of the shaft comprises wire strand.

3. The apparatus of claims 1 wherein the handle includes a gripping portion comprising a pair of knobs extending outwardly from an area of reduced diameter.

4. The apparatus of claim 1 wherein the seal is located in a cavity defined in the base of the handle.

5. A fluid measuring apparatus for an engine or a transmission reservoir comprising:
    a compressible shaft comprising first and second ends wherein the first end of the shaft comprises a fluid level indicator and further comprising an enlarged region having a cross-sectional diameter that is larger than the shaft,
    a tube comprising a first end comprising a coupler with an open end having an axial end and wherein said coupler has at least one lug, and a second end that is associated with the reservoir wherein at least a portion of the tube has a diameter that is smaller than said cross-sectional diameter,
    a handle connected to the second end of the shaft and comprising at least one slot that comprises an axial portion and a transverse portion, wherein the axial portion of said at least one slot is open and engages said at least one lug and the slot terminates at a second end that defines a locking seat such that said lug enters the first end of the slot and travels along the slot until becoming engaged in a locked position in the locking seat and wherein the shaft is compressed between the handle and the indicator blade, and;
    a gasket positioned in the base of the handle such that the gasket is compressed against the axial end of the coupler when said lug is in the locked position.

6. An engine or a transmission reservoir fluid level measuring apparatus comprising:
    a shaft comprising first and second ends wherein the first end of the shaft comprises a fluid level indicator or is connected to an indicator blade.
    a tube comprising at least one lug and further comprising at least one protuberance for contacting a portion of the shaft,
    a handle connected to the second end of the shaft and comprising at least one curvilinear slot, wherein an open portion of the slot is open in order to receive said at least one lug and the slot terminates in a locking seat wherein the shaft is deformed so as to reduce the distance between the handle and the indicator blade, and;
    a seal located in a cavity defined in the base of the handle such that the seal is compressible between the handle and an end face of the tube when the at least one lug and at least one slot are in the locked position and urges the handle into the locked position.

7. The apparatus of claim 6 wherein said at least one lugs are outwardly extending and said at least one slot extends entirely through a side wall of the handle.

8. The apparatus of claim 6 wherein said seal is capable of maintaining at least one atmosphere.

9. The apparatus of claim 6 wherein the apparatus comprises a fluid level indicator for a transmission and the seal permits venting.

10. The apparatus of claim 6 wherein said shaft comprises at least one wire.

11. The apparatus of claim 6 wherein said at least one lugs are inwardly extending.

12. The apparatus of claim 6 wherein a second end of said tube is associated with a fitting for engaging a fluid reservoir.

13. The apparatus of claim 6 wherein said shaft is associated with the handle by at least one of joining, bonding, molding and gluing.

14. The apparatus of claim 6 wherein said shaft is rotatable relative to said handle.

15. The apparatus of claim 6 wherein the shaft defines at least one enlarged area for engaging the protuberance.

16. The apparatus of claim 6 wherein engaging the protuberance causes the shaft to be compressed.

17. The apparatus of claim 16 wherein the protuberance comprises an inwardly extending detent.

18. The apparatus of claim 16 wherein the portion of the shaft that contacts the protuberance comprises an attachment having an outer diameter greater than the interior diameter of the tube adjacent to the protuberance.

19. The apparatus of claim 18 wherein the attachment comprises a bulb that that surrounds a connection between the shaft and an fluid level indicator blade.

20. The apparatus of claim 16 wherein the protuberance comprises a previously shaped component that is connected to the tube.

21. A fluid measuring apparatus for an engine or a transmission reservoir comprising:

a wire shaft comprising first and second ends wherein an indicator blade is connected to the first end of the shaft and further comprising an enlarged region on the shaft having a cross-sectional diameter that is larger than the remainder of the shaft, a tube comprising a first open end and a second end that is associated with the reservoir wherein at least a portion of the tube has a diameter that is smaller than said cross-sectional diameter of the enlarged region, and;

a handle connected to the second end of the shaft and having a bayonet connection between the handle and the tube and wherein the shaft is compressed so as to reduce the distance between the handle and the indicator blade when the enlarged region engages the portion of the tube.

22. The apparatus of claim 21 wherein the enlarged area is adjacent to the connection between the shaft and the indicator blade.

23. An apparatus for measuring fluid in a reservoir comprising:

a flexible shaft comprising first and second ends wherein an indicator blade is connected to the first end of the shaft and further comprising an enlarged region having a cross-sectional diameter that is larger than the shaft and is affixed to the connection between the shaft and the indicator blade, a tube comprising a first open end and a second end that is associated with the reservoir wherein at least a portion of the tube has a diameter that is smaller than said cross-sectional diameter of the enlarged region, a handle connected to the second end of the shaft and having a bayonet connection between the handle and the tube and wherein the shaft is deflected so as to reduce the distance between the handle and the indicator blade when the enlarged region engages the portion of the tube; and, a member in the handle that contacts the tube and provides a pressure seal.

24. The apparatus of claim 23 wherein the bayonet connection comprises at least one slot that comprises an axial portion and a transverse portion, wherein the axial portion of said at least one slot is open and engages said at least one lug on the handle and the slot terminates at a second end that defines a locking seat such that said lug enters the first end of the slot and travels along the slot until becoming engaged in a locked position in the locking seat.

* * * * *